United States Patent [19]
Takamori

[11] Patent Number: 5,896,181
[45] Date of Patent: *Apr. 20, 1999

[54] VIDEO SIGNAL PROCESSING APPARATUS WITH MATRIX SWITCHING CAPABILITY

[75] Inventor: Tsutomu Takamori, Kanagawa, Japan

[73] Assignee: Sony Corporation, Tokyo, Japan

[*] Notice: This patent is subject to a terminal disclaimer.

[21] Appl. No.: 08/891,815

[22] Filed: Jul. 14, 1997

Related U.S. Application Data

[63] Continuation of application No. 08/553,463, Nov. 28, 1995, Pat. No. 5,754,255, filed as application No. PCT/JP95/00512, Mar. 20, 1995.

[30] Foreign Application Priority Data

Mar. 30, 1994 [JP] Japan ..................... 6-061085

[51] Int. Cl.$^6$ ..................................... H04N 5/268
[52] U.S. Cl. ........................... 348/705; 348/706
[58] Field of Search ..................... 348/705, 706, 348/180, 192; 340/825.79, 825.8, 825.83

[56] References Cited

U.S. PATENT DOCUMENTS

| | | | |
|---|---|---|---|
| 4,855,999 | 8/1989 | Chao | 370/112 |
| 5,166,926 | 11/1992 | Cisneros et al. | 370/60 |
| 5,276,445 | 1/1994 | Mita et al. | 340/825.79 |
| 5,325,189 | 6/1994 | Mimura | 348/231 |

*Primary Examiner*—Victor R. Kostak
*Attorney, Agent, or Firm*—Frommer Lawrence & Haug, LLP; William S. Frommer

[57] ABSTRACT

A digital switcher of this invention comprises a matrix switcher section 11 adapted so that a plurality of serial digital video signals are inputted through respective input buses, a control section 12 for carrying out operation control of the matrix switcher section 11, signal processing sections 13A, 13B ... connected to a plurality of output buses of the matrix switcher section 11, an input detector 14 connected to one output bus of the matrix switcher section 11, and an error detector 15 connected to one output bus of the matrix switcher section 11. An approach is employed to control the matrix switcher section 11 by the control section 12 with respect to a plurality of digital video signals inputted through respective input buses to thereby selectively detect presence or absence of input and occurrence of error by the input detector 14 and the error detector 15 connected to one output bus of the matrix switcher section 11.

4 Claims, 6 Drawing Sheets

VIDEO SIGNAL PROCESSING APPARATUS WITH MATRIX SWITCHING CAPABILITY

This application is a continuation of application Ser. No. 08/553,463, filed Nov. 28, 1995, U.S. Pat. No. 5,754,255 which is a 371 of PCT JP95/00512 filed Mar. 20, 1995.

DESCRIPTION

1. Technical Field

This invention relates to a digital switcher adapted to select a desired digital signal from a plurality of digital signal inputs to output the digital signal thus selected.

2. Background Art

Generally, in broadcasting stations or production houses, etc., transmission and reception of digital video signals are carried out between a large number of video equipments through so called effect switchers which are digital video switchers for selecting a desired digital video signal from a plurality of digital video signal inputs to implement mix processing or wipe processing, etc. thereto.

As an interface for carrying out transmission of digital video signals, e.g., Society of Motion Picture and Television Engineers (SMPTE) of U.S.A. standardizes, as interface for digital video signals of the bit parallel system, a format for carrying out transmission of parallel digital video signals of 10 bits with respect to component signal at SMPTE125M.

Further, as an interface for digital video signals of the bit serial system which permits long distance transmission of video signals by a single cable, e.g. , in SMPTE, there is standardized SMPTE259M in which scrambled NRZI (Non Return to Zero Inverted) codes are employed as channel codes along with component signals and composite signals. Also in the International Radio Consultative Committee (CCIR), components signals are standardized as 656 III. Also in the European Broadcasting Union (EBU), components signals are standardized as Tech 3267.

In the format of the above-mentioned SMPTE259M, an approach is employed to bit-serially convert parallel digital video signals of 10 bits to carry out transmission of serial digital video signals as scrambled NRZI code. Moreover, with respect to the line monitoring, in the scrambled NRZI code, Error Detection and Handling (EDH) system is standardized, wherein there is employed a technique for carrying out transmission of digital video signals in which Ancillary data such as parity or check sum for detecting error produced in equipments within the system or interface, etc., or Cyclic Redundancy Check Code (CRCC), etc. are inserted at specific lines of the vertical blanking period. Namely, for monitoring transmission error, e.g., CRC code of data of full fields including ancillary data between one fields, CRC code of data consisting of only active pictures between one fields, and CRC code consisting of only ancillary data are calculated on the transmitting side, and these CRC codes are transmitted as EDH packet. As the generator polynomial (generating function) of the CRC code, $$C(X)=X^{16}+X^{12}+X^5+1$$

is used.

Outline of the format of Serial Digital Interface (SDI) standardized by the above-mentioned SMPTE259M is shown in the following table 1.

TABLE 1

| ITEM | Outline of SMPTE259M | |
|---|---|---|
| | COMPONENT | COMPOSITE |
| TRANSMISSION RATE (Mb/s) | 270.0 | 143.18 |
| CHANNEL CODING | SCRAMBLED NRZI $X = (X^9 + X^4 + 1)(X + 1)$ | |
| SERIAL SYNC SIGNAL | 3FF, 000, 000 | |
| SIGNAL AMPLITUDE | 800 mV ± 10% (750 ohms TERMINATION) | |
| NO. OF AUDIO CHANNELS | 8ch | 4ch |

Meanwhile, while approach is employed to insert ancillary data for error correction into a digital video signal to carry out serial digital transmission, thereby making it possible to monitor, by equipments of the receiving side, generating state of error in equipments of the transmitting side or transmission path, in broadcasting stations or production houses where a large number of video equipments are used in combination, in the case where error detectors for carrying our error detection on the basis of the ancillary data are provided every equipments, not only scale of the hardware becomes large, but also it is difficult to precisely carry out management of error generating state in respective equipments or transmission path.

In view of actual circumstances of the prior arts as described above, an object of this invention is to have an ability to precisely carry out management of generating state of error in respective equipments or transmission path without allowing the scale of hardware to be large in broadcasting stations or production houses where a large number of video equipments are used in combination.

Another object of this invention is to provide a digital switcher having error detecting function.

A further object of this invention is to provide a digital switcher having error detecting function and input detecting function.

A still further object of this invention is to provide a digital switcher having display function of displaying results of error detection and input detection.

DISCLOSURE OF THE INVENTION

In a digital switcher according to this invention, with respect to a plurality of digital signals inputted to a matrix switcher section through input buses, an approach is employed to control the matrix switcher section by control means to thereby selectively carry out error detection by an error detector connected to one output bus of the matrix switcher section. Namely, a digital switcher according to this invention comprises: a matrix switcher section including a plurality of input buses and a plurality of output buses, and adapted so that a plurality of digital signals are inputted thereto through the plurality of input buses; control means for carrying out a control to allow the matrix switcher section to select any one of a plurality of digital signals inputted to the matrix switcher section through the plurality of input buses to output the selected signal from a desired one of the plurality of output buses; and an error detector connected to one of the plurality of output buses of the matrix switcher section, and adapted for detecting error of the digital signals delivered from the matrix switcher section through the output bus.

Moreover, in the digital switcher according to this invention, error detection is carried out by error detector externally connected to one output bus of the matrix switcher section. Namely, the digital switcher according to this invention is characterized in that the error detector is externally connected to one output bus of the matrix switcher section.

Further, in the digital switcher according to this invention, signal processing is implemented, by a signal processing section or sections, to a digital signal selected by the matrix switcher section. Namely, the digital switcher according to this invention is characterized in that it comprises at least one signal processing section connected to any one of a plurality of output buses of the matrix switcher section.

Further, in the digital switcher according to this invention, selection of parallel digital signals inputted through a plurality of input buses is carried out by the matrix switcher section. Namely, the digital switcher according to this invention is characterized in that digital signals inputted through the plurality of input buses are parallel digital signals.

Further, in the digital switcher according to this invention, selection of serial digital signals inputted through a plurality of input buses is carried out by the matrix switcher section. Namely, the digital switcher according to this invention is characterized in that digital signals inputted through the plurality of input buses are serial digital signals.

Further, in the digital switcher according to this invention, parallel digital signals obtained by converting serial digital signal are delivered to the matrix switcher section. Namely, the digital switcher according to this invention is characterized in that it comprises converting means for converting the serial digital signal into parallel digital signals, wherein the parallel digital signals are delivered to the matrix switcher section.

Further, in the digital switcher according to this invention, the error detector converts the serial digital signal into parallel digital signals to carry out error detection. Namely, the digital switcher according to this invention is characterized in that the error detector comprises a converting section for converting the serial digital signal into parallel digital signals, and an error detecting section for detecting error of the parallel digital signals.

Further, in the digital switcher according to this invention, presence or absence of input of digital signals delivered through the plurality of input buses is detected by one input detector. Namely, the digital switcher according to this invention is characterized in that it further comprises an input detector connected to an output bus to which the error detector is connected of the plurality of output buses of the matrix switcher section and adapted to detect presence or absence of input of the digital signal.

Further, in the digital switcher according to this invention, error detection and presence or absence of input of the plurality of digital signals are carried out by error detector and input detector externally connected to one output bus of the matrix switcher section. Namely, the digital switcher according to this invention is characterized in that the error detector and the input detector are externally connected to one output bus of the matrix switcher section.

Further, in the digital switcher according to this invention, detection results by the error detector and the input detector are displayed by a display section. Namely, the digital switcher according to this invention is characterized in that it further comprises display section for displaying both detection results by the error detector and the input detector.

Further, in the digital switcher according to this invention, when the error detector detects error of the digital signal, and the input detector detects that the digital signal has been inputted, it is judged that the digital signal is error (in error state). Namely, the digital switcher according to this invention is characterized in that both detection results of the error detector and the input detector are inputted to the control means, whereby only when the error detector detects error of the digital signal, and the input detector detects that the digital signal has been inputted, the control means judges that the digital signal is error.

In addition, in the digital switcher according to this invention, selection of digital video signals inputted through a plurality of input buses is carried out by the matrix switcher section. Namely, the digital switcher according to this invention is characterized in that the digital signal is digital video signal.

BEST MODE FOR CARRYING OUT THE INVENTION

Respective embodiments of a digital switcher according to this invention will now be described in detail with reference to the attached drawings.

Figure 1:
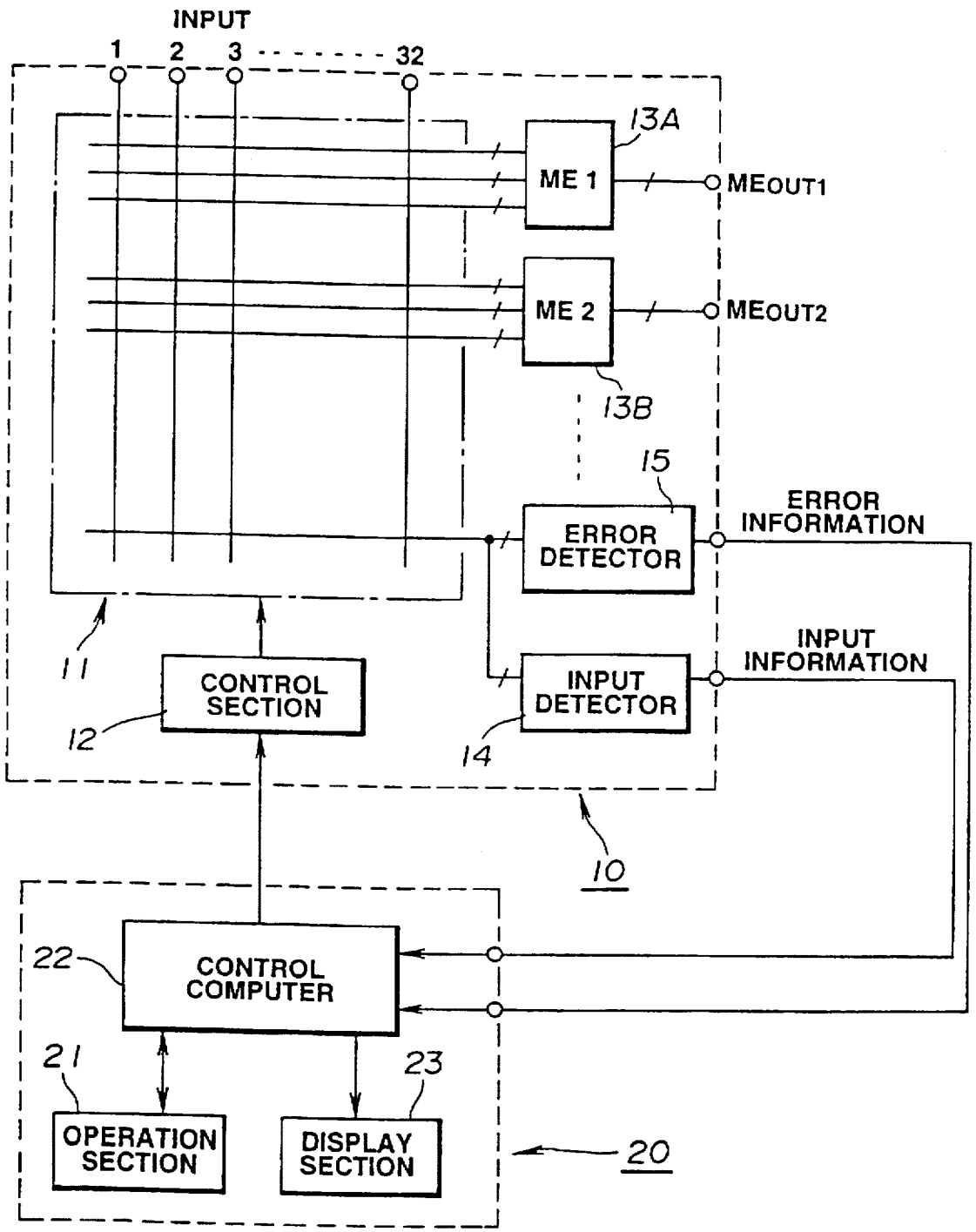
FIG. 1 is a block diagram showing a configuration of a switching system according to the invention.

A digital switcher according to this invention is constituted as shown in FIG. 1, for example.

This digital switcher 10 is a digital video switcher for handling serial digital video signals of a plurality of channels in conformity with, e.g., the SMPTE259M standard, and comprises a matrix switcher section 11 adapted so that plural serial digital video signals are inputted thereto through respective input buses, a control section 12 for carrying out operation control of the matrix switcher section 11, signal processing sections 13A, 13B . . . connected to a plurality of output buses of the matrix switcher section 11, an input detector 14 connected to one output bus of the matrix switcher section 11, and an error detector 15 connected to one output bus of the matrix switcher section 11.

Here, digital video signals of respective channels inputted to the matrix switcher section 11 through respective input buses are serial digital video signals in conformity with the SMPTE259M standard, wherein ancillary data for error detection are respectively inserted at specific lines of the vertical blanking period.

Figure 2:
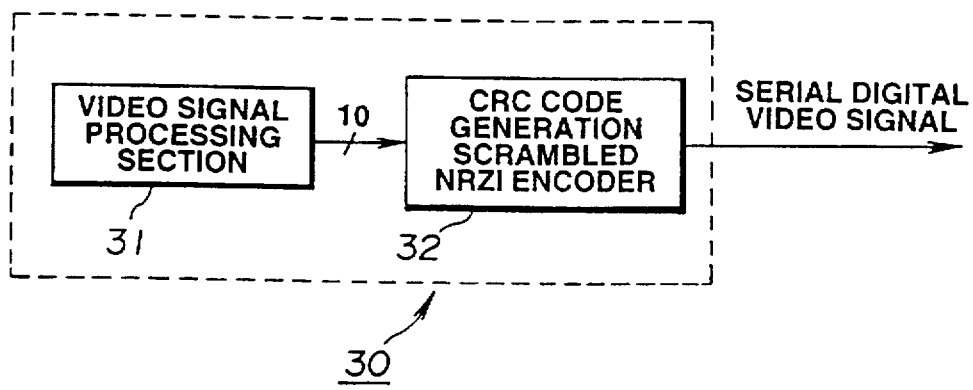
FIG. 2 is a block diagram showing a serial digital video signal generator according to the invention.

Namely, to the matrix switcher section 11, serial digital video signals are (sequentially) delivered, as shown in FIG. 2, for example, from an equipment 30 of the transmitting side such as a video camera, etc. provided with an encoder 32 in conformity with the SMPTE259M standard.

The encoder 32 is adapted to calculate, with respect to parallel digital video signals of 10 bits in conformity with, e.g., the SMPTE125M standard obtained at a video signal processing section 31, CRC code of data of full fields including ancillary data between one fields, CRC code of data consisting of only active pictures between one fields, and CRC code consisting of only ancillary data by the generator polynomial (generating function) expressed below:

$$C(X)=X^{16}+X^{12}+X^5+1$$

to generate EDH packet to further change it into scrambled NRZI codes thereafter to bit-serially convert them to thereby generate a serial digital video signal in conformity with the SMPTE259M standard.

In the digital switcher 10 of this embodiment, control data from a control computer 22 for carrying out control operation corresponding to an operation input from an operation section 21 provided at an external console (unit) 20 is delivered to the control section 12. The control section 12 carries out, on the basis of control data delivered from the control computer 22, a control to allow the matrix switcher section 11 to (sequentially) select inputted serial digital video signals of plural channels to output the selected signals from the output buses.

Moreover, the respective signal processing sections 13A, 13B . . . implement effect processing such as mix processing and/or wipe processing, etc. to the serial digital video signals of plural channels selected by the matrix switcher section 11 to output effect processing implemented serial digital video signals $ME_{OUT1}$, $ME_{OUT2}$ . . . .

Further, the input detector 14 detects presence or absence of serial digital video signal delivered through the output bus of the matrix switcher section 11 to thereby detect presence or absence of serial digital video signals of respective channels inputted through input buses to the matrix switcher section 11. Then, this input detector 14 delivers input information indicating presence or absence of respective inputs to the matrix switcher section 11 to the control computer 22 of the console 20.

In addition, the error detector 15 is adapted so that, with respect to serial digital video signal delivered through the output bus of the matrix switcher section 11, it carries out error detection on the basis of ancillary data inserted at specific lines of the vertical blanking period. Then, this error detector 15 delivers, to the control computer 22 of the console 20, error information indicating that any error takes place in the serial digital video signal delivered through the output bus of the matrix switcher section 11.

Figure 3:
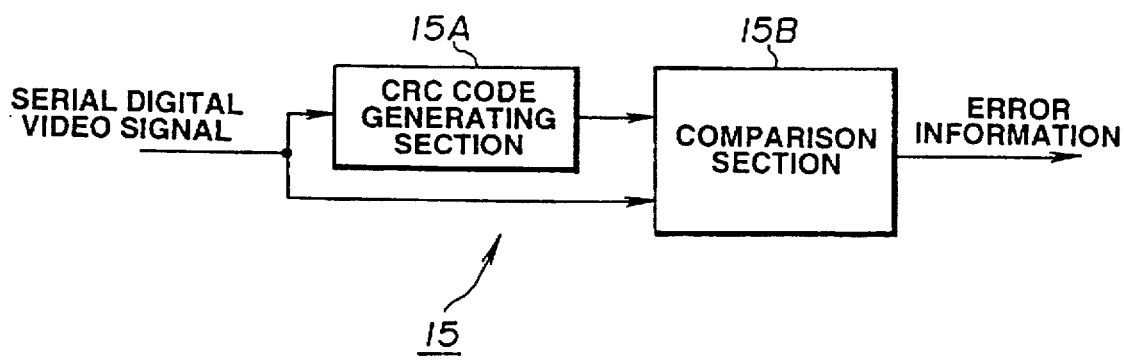
FIG. 3 is a block diagram of an error detector for detecting errors in serial digital video signals in accordance with the invention.

The error detector 15 is composed, as shown in FIG. 3, for example, of a CRC code generating section 15A supplied with a serial digital video signal through the output bus of the matrix switcher section 11, and a comparison section 15B.

Figure 4:
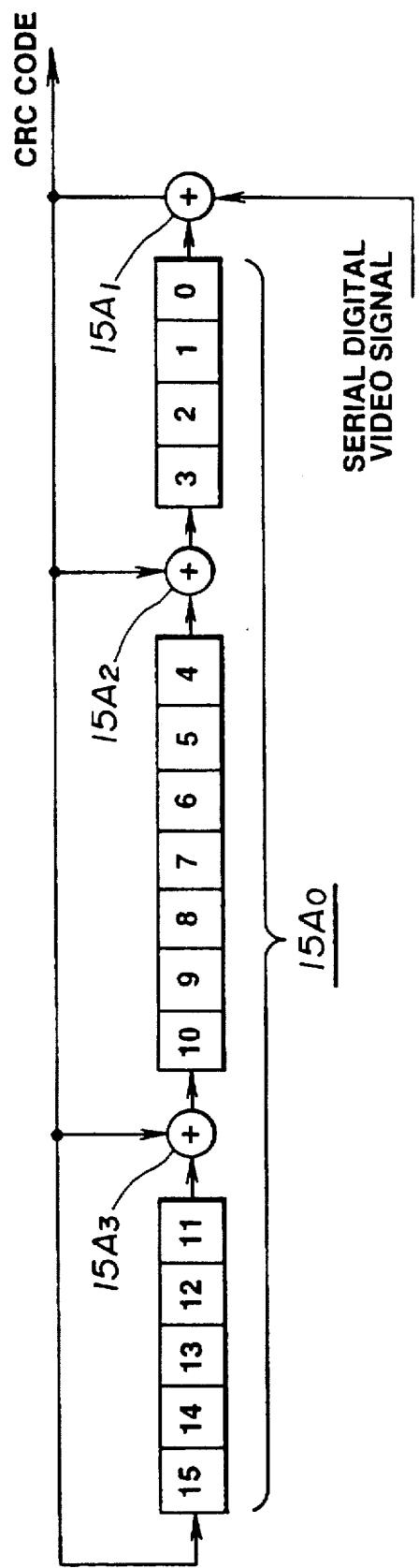
FIG. 4 is a block diagram showing a configuration of the CRC code generating section of FIG. 3.

The CRC code generating section 15A is operative so that, with respect to the serial digital video signal, it calculates CRC code of data of full fields including ancillary data between one fields, CRC code of data consisting of only active pictures between one fields, and CRC code consisting of only ancillary data by the generator polynomial (generating function) expressed below:

$$C(X)=X^{16}+X^{12}+X^5+1$$

to deliver respective CRC codes to the comparison section 15B. At the CRC code generating section 15A, calculation of the generator polynomial is carried out by a logic circuit composed of a 16 bit register $15A_0$ and three two-input Exclusive Logical Sum circuits (EX-OR gates) $15A_1$, $15A_2$, $15A_3$ as shown in FIG. 4, for example.

The comparison section 15B makes comparison between respective CRC codes sent from equipment of the transmitting side as ancillary data inserted at specific lines of the vertical blanking period of serial digital video signal delivered through the matrix switcher section 11 and respective CRC codes generated by the CRC code generating section 15A to output its anti-coincidence (disagreement) information as error information.

In this embodiment, the control section 12 has, e.g., diagnostic mode, and controls, at the time of the diagnostic mode, the matrix switcher section 11 on the basis of control data given by the control computer 22 so as to sequentially select inputted serial digital video signals of respective channels by the matrix switcher section 11 to deliver them to the input detector 14 and the error detector 15.

Accordingly, at the time of the diagnostic mode, with respect to serial digital video signals of respective channels inputted to the matrix switcher section 11, presence or absence of input can be sequentially detected by the input detector 14, and error detection can be sequentially carried out by the error detector 15.

Then, the control computer 22 allows a display section 23 provided at the console 20 to display input circumstances and error generating state of serial digital video signals of respective channels to the matrix switcher section 11 on the basis of input information delivered from the input detector 14 and error information delivered from the error detector 15.

Figure 5:
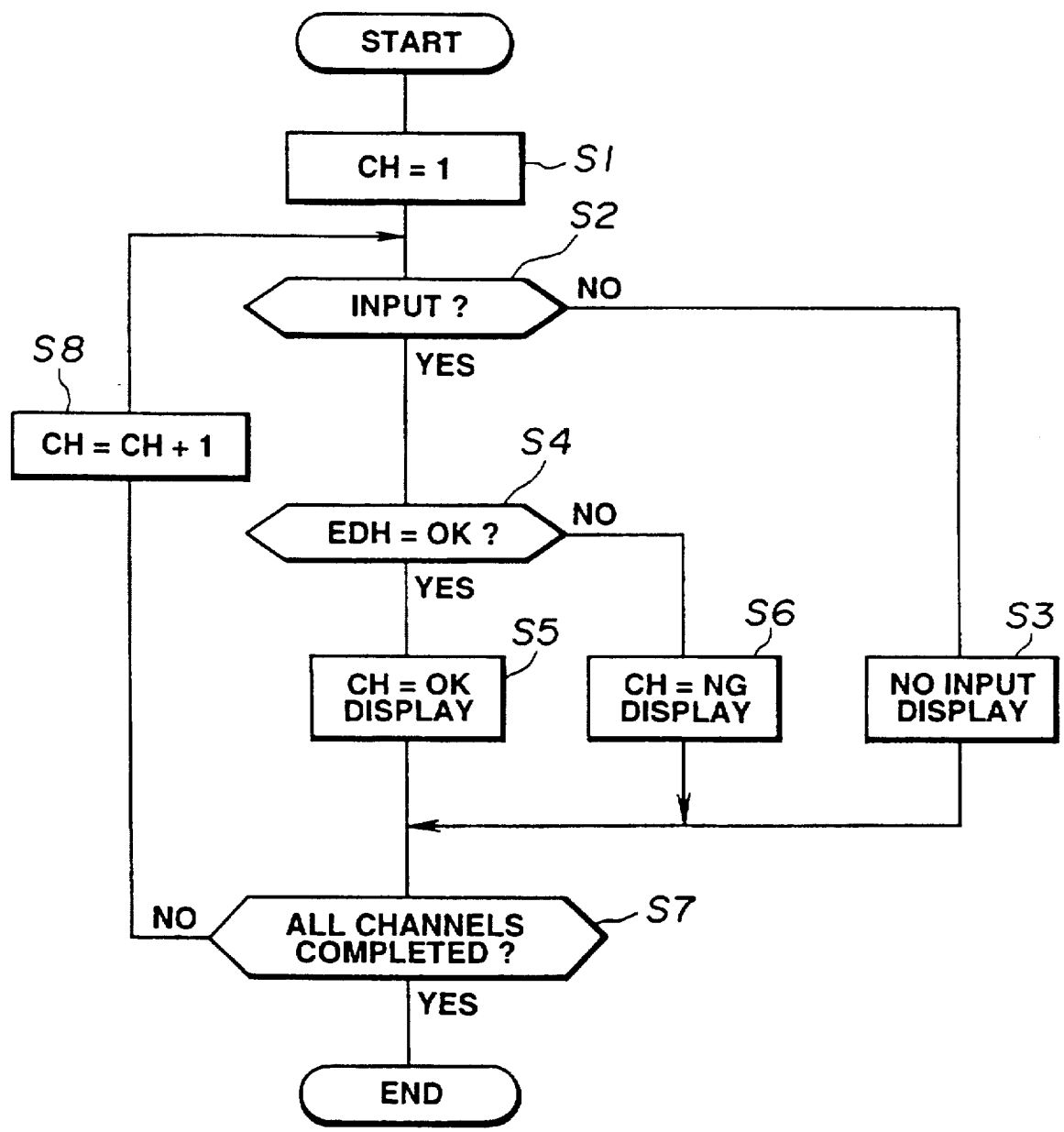
FIG. 5 is a flowchart illustrating the operations performed when the invention is operating in a diagnostic mode.

When the operation of the control computer 22 enters the diagnostic mode, it is adapted to carry out a control operation as indicated by the flowchart of FIG. 5.

Namely, when the operation of the control computer 22 enters the diagnostic mode, this computer 22 first sets channel information CH indicating input channel to CH=1 at step S1 to designate an input channel at the control section 12.

At the subsequent step S2, judgment processing as to whether or not serial digital video signal is inputted to the designated input channel is carried out on the basis of input information from the input detector 14. In the case where the judgment result at this step S2 is "NO", i.e., serial digital video signal is not detected by the input detector 14, the control operation shifts to step S3 to carry out display control to allow the display section 23 to display that there is no input in that channel. Moreover, in the case where judgment result at the step S2 is "YES", i.e., serial digital video signal is detected by the input detector 14, the control operation shifts to step S4.

At the step S4, judgment processing as to whether or not there is no error in the serial digital video signal of the designated input channel is carried out on the basis of error information from the error detector 15. In the case where judgment result at the step S4 is "YES", i.e., error of serial digital video signal is not detected by the error detector 15, the control operation shifts to step S5 to carry out a display control to allow the display section 23 to display that there is no error in the serial digital video signal of that channel. Moreover, in the case where judgment result at the step S4 is "NO", i.e., error of the serial digital video signal is detected by the error detector 15, the control operation shifts to step S6 to carry out a display control to allow the display section 23 to display that there is error in the serial digital video signal of that channel.

Subsequently to the display control of the step S3, the step S5 or the step S6, the control operation shifts to step S7 to carry out judgment processing as to whether or not processing has been carried out with respect to all channels. In the case where judgment result at the step S7 is "NO", i.e., there is a channel or channels to be processed, the control operation shifts to step S8 to set channel information CH indicating input channel to CH=CH+1 to return to the judgment processing of the step S2 to carry out processing of the next input channel. In addition, in the case where judgment result at the step S7 is "YES", i.e., there is no channel to be processed, the control operation of the diagnostic mode is completed.

Thus, with respect to all channels of the digital switcher 10, it is possible to display, at the display section 23, error generating state in various video equipments or transmission path for delivering serial digital video signals along with the input circumstances of respective channels. Accordingly, by confirming the display content of the display section 23, it is possible to precisely monitor generating state of error along with input circumstances of respective channels. Namely, while the error detector 15 detects error even when no serial digital video signal is inputted to the input channel, since it is detected by the input detector 14 that no serial digital video signal is inputted to the input channel, there is no possibility that it might be judged that any error takes place in the serial digital video signal although no serial digital video signal is inputted to the input channel.

While, in this embodiment, input information obtained by the input detector 14 and error information obtained by the error detector 15 are delivered to the control computer 22 to allow the display section 23 provided at the console 20 to display input circumstances or error generating state of a plurality of serial digital video signals, an approach may be employed to deliver the error information to an external equipment management unit to carry out management of error generating state along with data of utilization circumstances and/or working circumstances of equipment. Moreover, the input detector 14 and the error detector 15 may be externally connected to one output bus of the matrix switcher section 11 without allowing them to be included or incorporated within the body of the digital switcher 10. Further, while, in the digital switcher 10 of this embodiment, the signal processing sections 13A, 13B . . . are provided at the output buses of the matrix switcher section 11 so as to function as so called effect switcher, in the case where the function of effect switcher is not required, the signal processing sections 13A, 13B . . . can be omitted.

Figure 6:
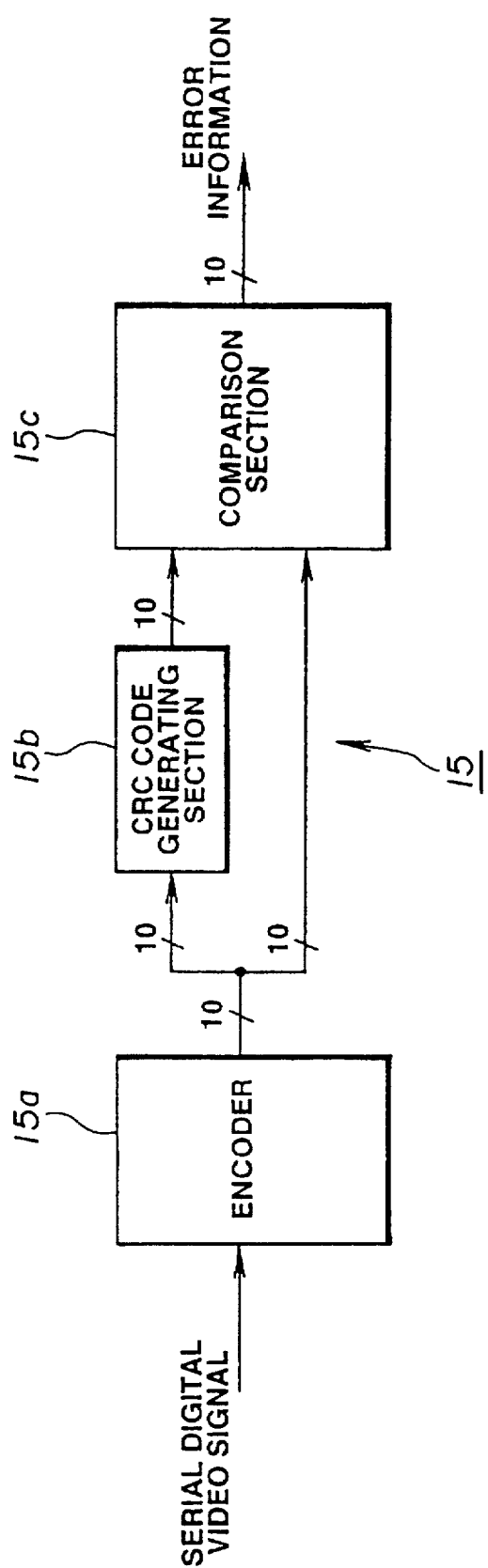
FIG. 6 is a block diagram of an alternative error detector for detecting errors in serial digital video signals in accordance with the invention.

Moreover, while the error detector 15 in the above-described embodiment is adapted to detect error of serial digital video signal by logic in the serial domain, e.g., a configuration as shown in FIG. 6 may be employed to detect such error by logic in the parallel domain.

The error detector 15 shown in FIG. 6 includes, at the input stage, an encoder 15a for converting a serial digital video signal delivered through the output bus of the matrix switcher section 11 into parallel digital video signals, wherein parallel digital video signals obtained by the encoder 15a are delivered to a CRC code generating section 15b and a comparison section 15c.

The CRC code generating section 15b is operative so that, with respect to parallel digital video signals obtained by the encoder 15a, it calculates CRC code of data of full fields including ancillary data between one fields, CRC code of data consisting of only active pictures between one fields, and CRC code consisting of only ancillary data by the generator polynomial (generating function) expressed below:

$$C(X)=X^{16}+X^{12}+X^5+1$$

to deliver respective CRC codes to the comparison section 15c. This CRC code generating section 15c is composed of, e.g., one 16 bit register and thirty two-input Exclusive Logical Sum Circuits (EX-OR gates). It is thus possible to perform calculation of the generator polynomial by this logic circuit.

The comparison section 15c is operative so that, with respect to parallel digital video signals obtained by the encoder 15a, it makes comparison between respective CRC codes sent from equipment of the transmitting side as ancillary data inserted at specific lines of the vertical blanking period and respective CRC codes generated by the CRC code generating section 15b, thereby making it possible to detect (output) its anti-coincidence information as error information.

Figure 7:
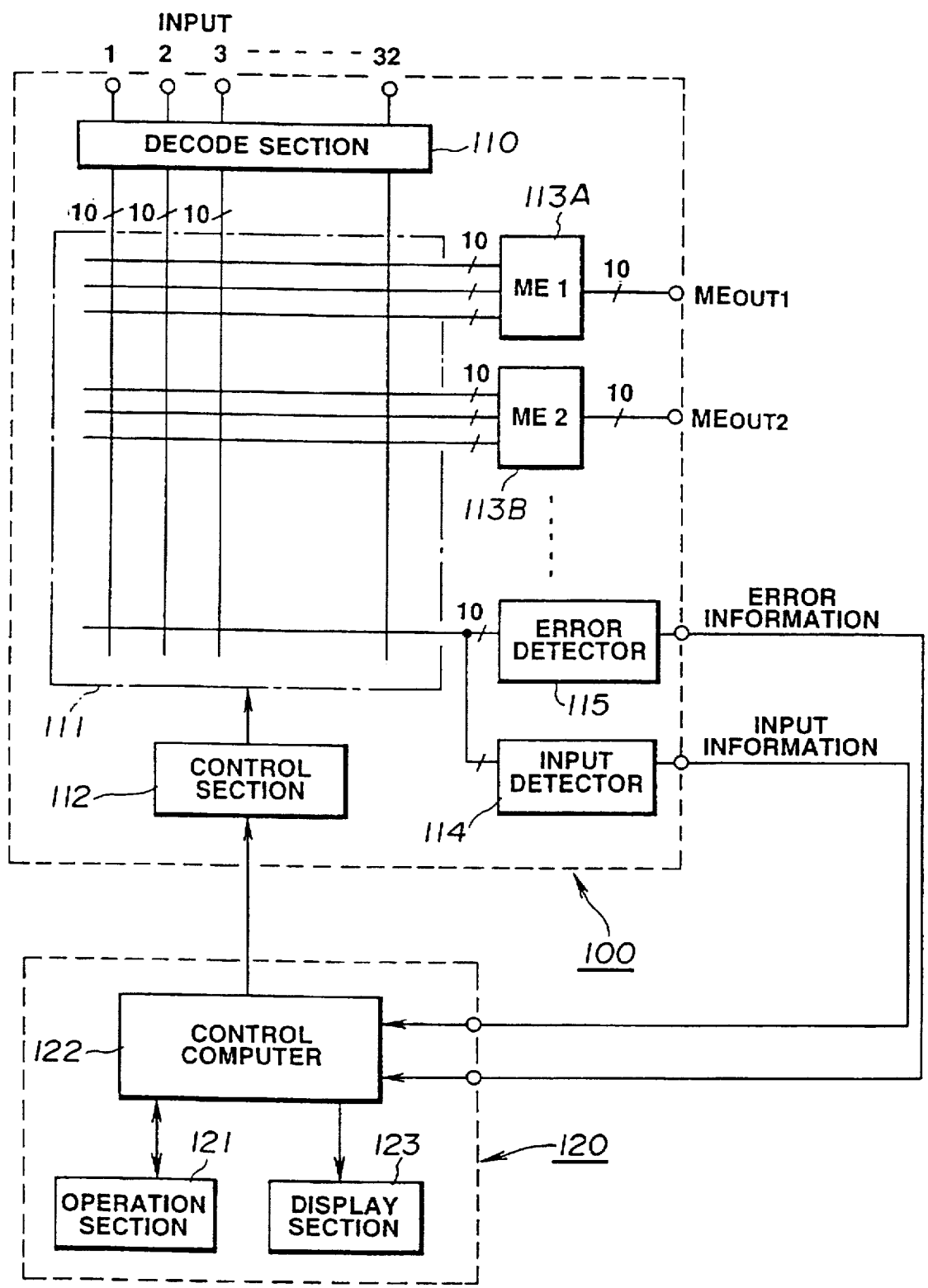
FIG. 7 is a block diagram showing an alternative configuration of a digital switching system according to the invention.

While the digital switcher 10 of the above-described embodiment is of a structure to handle serial digital video signals by logic in the serial domain as they are, there may be employed a configuration as shown in FIG. 7, for example, to convert serial digital video signals into parallel digital video signals by using converting means to handle them by logic in the parallel domain.

Namely, a digital switcher 100 shown in FIG. 7 is adapted to handle serial digital video signals of a plurality of channels in conformity with, e.g., the SMPTE259M standard, and comprises a decode section 110 in conformity with the SMPTE259M standard supplied with serial digital video signals of respective channels through respective input buses, a matrix switcher section 111 supplied with parallel digital video signals of respective channels converted into 10 bit parallel digital video signals by the decode section 110, a control section 112 for carrying out operation control of the matrix switcher section 111, signal processing sections 113A, 113B . . . connected to a plurality of output buses of the matrix switcher section 111, an input detector 114 connected to one output bus of the matrix switcher section 111, and an error detector 115 connected to one output bus of the matrix switcher section 111.

The digital switcher 100 of this embodiment is adapted so that control data is delivered from a control computer 122 for carrying out control operation corresponding to an operation input from an operation section 121 provided at an external console 120 to the control section 112. Further, the control section 112 carries out a control to (sequentially) select, on the basis of control data delivered from the control computer 122, inputted parallel digital video signals of a plurality of channels by the matrix switcher section 111 to allow them to be outputted from the output buses.

The matrix switcher section 111 is operative to select, by logic in the parallel domain, parallel digital video signals of respective channels inputted through the decode section 110, and is caused to undergo selective control of input/output by the control section 112.

Moreover, the respective signal processing sections 113A, 113B . . . implement mix processing or wipe processing, by logic in the parallel domain, to parallel digital video signals of respective channels selected by the matrix switcher section 111 to output effect processing implemented parallel digital video signals $ME_{OUT1}$, $ME_{OUT2}$ . . . .

Further, the input detector 114 detects presence or absence of parallel digital video signals delivered through the output buses of the matrix switcher section 111 to thereby detect presence or absence of serial digital video signals of respective channels inputted to the decode section 110 through respective input buses. The input detector 114 delivers, to the control computer 122 of the console 120, input information indicating presence or absence of respective inputs to the matrix switcher section 111.

Further, the error detector 115 is operative so that, with respect to parallel digital video signals delivered through the output buses of the matrix switcher section 111, it carries out, by logic in the parallel domain, error detection on the basis of ancillary data inserted at specific lines of the vertical blanking period. Then, this error detector 115 delivers, to the control computer 122 of the console 120, error information indicating that any error takes place in a parallel digital video signal delivered through the output bus of the matrix switcher section 111.

In addition, the control computer 122 allows a display section 123 provided at the console 120 to display input circumstances and error generating state of serial digital video signals of respective channels to the decode section 110 on the basis of input information delivered from the input detector 114 and error information delivered from the error detector 115.

It should be noted that while the digital switcher 100 of this embodiment is adapted to input serial digital video signals of a plurality of channels, there may be employed a configuration in which the decode section 110 is omitted to directly input parallel digital video signals of a plurality of channels to the matrix switcher section 111 to thereby handle those parallel digital video signals.

What is claimed is:

1. A signal processing apparatus, comprising:

converting means for converting a plurality of serial video signals into a plurality of parallel video signals;

a matrix switching unit including a plurality of input lines for receiving said parallel video signals, a plurality of output lines intersecting said input lines at a plurality of intersection points, and a plurality of switches for selectively coupling said input lines to said output lines at said intersection points;

control means for controlling said matrix switching unit to couple at least one of said parallel video signals from one of said input lines to one of said output lines via said switches;

a video signal processing means coupled to said one output line for processing said at least one parallel video signal at least one second output line intersecting said input lines at a plurality of second intersection points, said second output line being distinct from said plurality of output lines, said matrix switching unit having a plurality of second switches for selectively coupling said input lines to said second output line;

wherein said control means is operative to control said matrix switching unit for the purpose of coupling a distinct signal included in said parallel video signals from one of said input lines to said second output line via said second switches; and a data processing means coupled to said second output line for processing said distinct signal.

2. The signal processing apparatus according to claim 1, wherein said distinct signal includes error information indicating that at least one of said serial video signals contains an error.

3. The signal processing apparatus according to claim 1, wherein said distinct signal is embedded in a vertical blanking period of at least one of said parallel video signals.

4. The signal processing apparatus according to claim 2, wherein said data processing means is an error detecting means for detecting said error information.

* * * * *